H. B. LAYMAN.
REAR WHEEL AND AXLE CONSTRUCTION FOR AUTOMOBILES.
APPLICATION FILED OCT. 18, 1913.
1,142,336. Patented June 8, 1915.
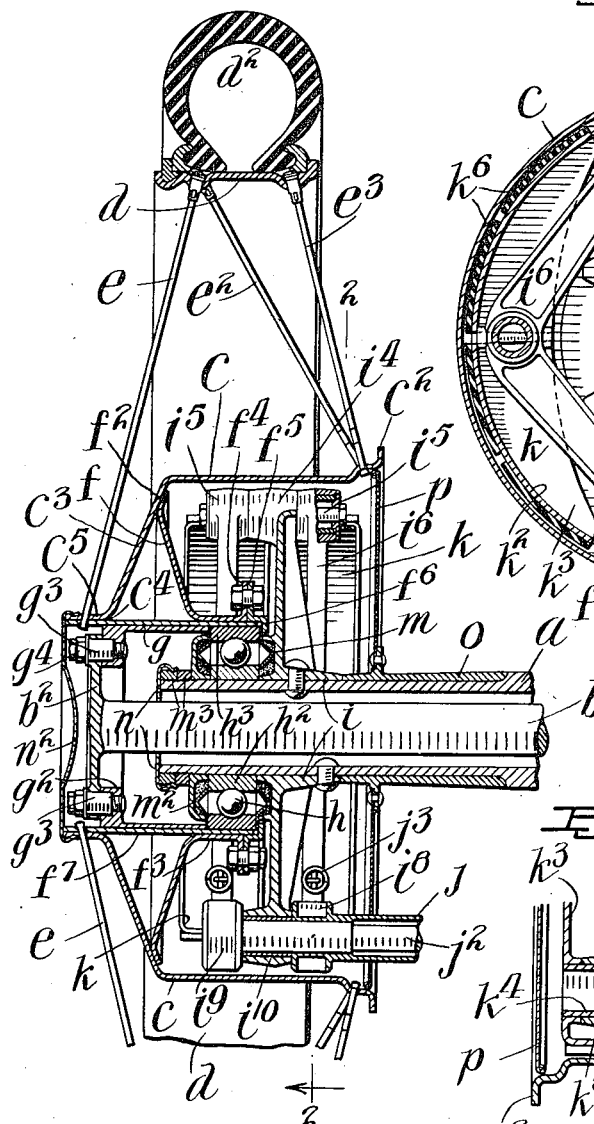
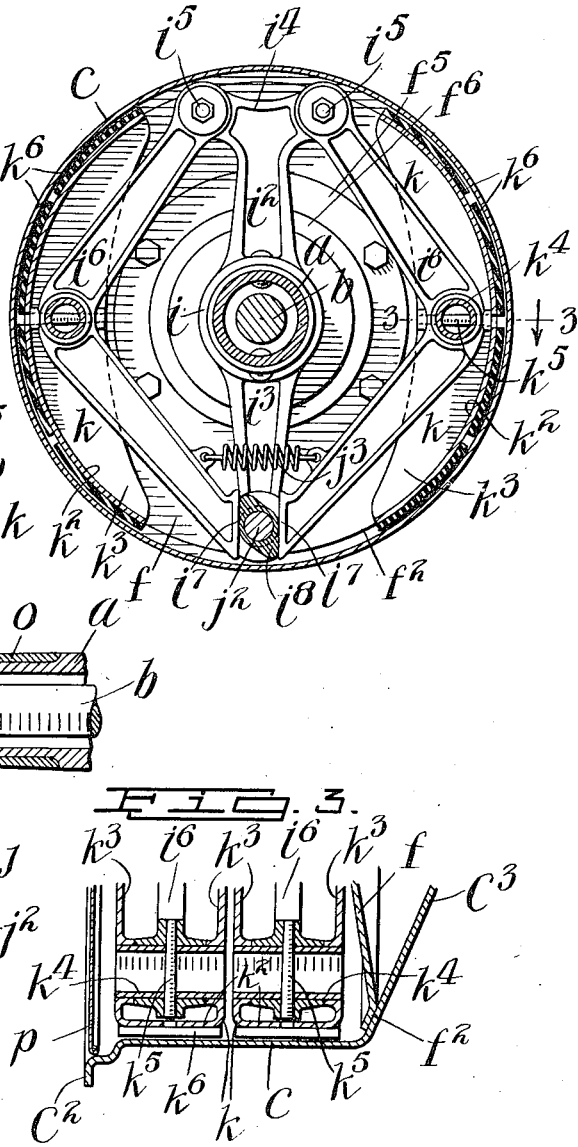
Witnesses:
H. E. Thompson.
S. Andrews.
Inventor
Hebron B. Layman,
By his Attorneys
Edgar Tate & Co.

UNITED STATES PATENT OFFICE.

HEBRON B. LAYMAN, OF NEW YORK, N. Y., ASSIGNOR OF ONE-HALF TO FRANK E. LONAS, OF NEW YORK, N. Y.

REAR WHEEL AND AXLE CONSTRUCTION FOR AUTOMOBILES.

1,142,336.

Specification of Letters Patent. Patented June 8, 1915.

Application filed October 18, 1913. Serial No. 795,820.

*To all whom it may concern:*

Be it known that I, HEBRON B. LAYMAN, a citizen of the United States, and residing at New York, in the county of New York and State of New York, have invented certain new and useful Improvements in Rear Wheel and Axle Constructions for Automobiles, of which the following is a specification, such as will enable those skilled in the art to which it appertains to make and use the same.

This invention relates to the wheels and axles of automobiles or other power driven vehicles and particularly to the rear wheels and rear axle thereof, and the object of the invention is to provide an improved rear wheel and axle shaft construction for vehicles of this class which possesses the greatest possible strength and endurance in proportion to the weight thereof, and which also involves improved means for connecting the axle shaft with the wheels, and an improved brake mechanism for said wheels; and with these and other objects in view, the invention consists in a rear wheel and axle shaft mechanism for power driven vehicles constructed and operating as hereinafter described and claimed.

The invention is fully disclosed in the following specification of which the accompanying drawing forms a part, in which the separate parts of my improvement are designated by suitable reference characters in each of the views, and in which:—

Figure 1 is a vertical section through one of the rear wheels of an automobile or power driven vehicle constructed according to my invention and showing the axle in section, and the axle shaft in full lines; Fig. 2 a section on the line 2—2 of Fig. 1; and Fig. 3 a partial section on the line 3—3 of Fig. 2.

In the drawing forming part of this specification, I have shown at $a$ the rear axle of an automobile and at $b$ the axle shaft which, in practice, is connected with the gear box and driven thereby or therefrom in the usual manner, said gear box being not shown.

The axle shaft $b$ is provided at its outer end with a head $b^2$, and the wheel proper which is mounted on the axle $a$ comprises a main central rotary hub and brake drum member $c$, and a rim $d$ connected with the central rotary hub member by spokes $e$, $e^2$ and $e^3$. The rim $d$ may be of any preferred construction, and mounted thereon is a tire $d^2$ which may also be of any desired construction and which may be connected with the rim $d$ in any preferred manner.

The hub and brake drum member $c$ is open on its inner side and is provided with an outwardly directed flange $c^2$, and the spokes $e^2$ and $e^3$ are connected with the rim $d$ near the outer and inner edges thereof and with the inner portions of the hub member $c$ adjacent to the flange $c^2$.

The hub and brake drum member $c$ is provided on its outer side with a convex closure plate $c^3$ which is preferably formed integrally therewith and the central portion of which is provided with an opening $c^4$ and an outwardly directed rim $c^5$, and inwardly of the closure plate $c^3$ of the hub member $c$ is an annular plate $f$ which is secured to the plate $c^3$ at $f^2$, and which is inwardly convex and which is provided with an inwardly directed annular rim $f^3$ having an outwardly directed flange $f^4$ to which is secured an annular plate $f^5$ having an L-shaped inner rim $f^6$.

Within the plates $c^3$ and $f$ is placed a drum-shaped casing $f^7$ which is secured to the rim $c^5$ of the plate $c^3$ and the rim $f^3$ of the plate $f$, and secured in the casing $f^7$ is a sleeve $g$ provided at its outer end with an inner annular head $g^2$ to which the head $b^2$ of the axle shaft $b$ is secured by means of screw bolts $g^3$ which are passed inwardly through the head $b^2$ of the axle shaft $b$, and through the head $g^2$ of the sleeve $g$ and the inner ends of which are riveted, and the outer ends of which are provided with lock nuts and washers $g^4$, and the parts $f^7$ and $g$ form a central supplemental hub member within and concentric to the main hub and brake drum member $c$, and which projects outwardly beyond the rim $d$, while the main hub and brake drum member $c$ projects inwardly of said rim, and the connection of the spokes $e$, $e^2$ and $e^3$ with the inner side or end portion of the main hub or brake drum member, as shown, and with the outer end of the central supplemental hub member formed by the parts $f^7$ and $g$ brace the wheel at all points and give it a maximum of strength in proportion to the weight of the material employed.

Between the inner end of the drum-shaped casing $f^7$ and the axle $a$ are placed ball bearings $h$ involving an inner race band $h^2$, and an outer race band $h^3$ between which the balls are placed, and the inner race band $h^2$ is secured to the axle $a$, and the outer race band $h^3$ is secured in the inner end of the casing $f^7$ and spaced therein by the sleeve $g$ and the L-shaped flange or rim $f^6$ of the plate $f^5$.

Mounted on the axle $a$ inwardly of the ball bearings $h$ and casing $f^7$ and sleeve $g$ is a hub $i$ having oppositely arranged radial arms $i^2$ and $i^3$, and the arm $i^2$ is provided with a cross head $i^4$ to which are pivoted at $i^5$ brake arms $i^6$ which are arranged in pairs, as clearly shown, and said arms are approximately L-shaped in form and the free ends thereof are provided with flat heads $i^7$ adapted to be operated upon by cam blocks $i^8$ and $i^9$ the first of which is connected with a tubular brake operating shaft $j$ and the second with a supplemental brake operating shaft $j^2$ which passes through the tubular shaft $j$.

The shaft $j^2$ passes through the head $i^{10}$ of the arm $i^3$ and is supported thereby, while the shaft $j$ is supported by the shaft $j^2$. The free ends of the separate pairs of brake arms $i^6$ are also connected by spiral springs $j^3$, and connected with the elbow portions of each arm of the separate pairs of brake arms $i^6$ are arc-shaped brake shoes $k$ comprising convex outer shell portions $k^2$ and inwardly directed side flanges $k^3$, and in making this connection, a sleeve $k^4$ is passed through the elbows of the arms $i^6$ and secured therein by tapered pins $k^5$, and the brake shoes $k$ are mounted on and rotatable on the ends of said sleeves, and the faces of said brake shoes are provided with fibrous or other bearing surfaces or cushions $k^6$.

It must be borne in mind however, that this invention is not limited to the particular form of brake mechanism herein shown and described, and any suitable apparatus of this class may be employed.

The ball bearings $h$ are provided outwardly of the hub $i$ and inwardly of said bearings with packing and packing gaskets $m$, and on the outer side of said bearings are packing and packing gaskets $m^2$ held in place by nuts and lock nuts $m^3$ on the end of the axle $a$, and the end of said axle is also inclosed by a cap $n$ through which the axle shaft $b$ passes, and the central hub member formed by the parts $f^7$ and $g$ is closed by a cap $n^2$. Mounted on and secured to the axle $a$ inwardly of the wheel proper and extending into the central hub and drum member $c$ is a sleeve $o$ with which is connected a plate $p$ through which the shafts $j$ and $j^2$ pass, and said plate fits in and closes the inner side of the hub member $c$, as clearly shown.

It will be understood that the axle shaft $b$ is composed of two parts, only one of which is shown, and both of said parts are coupled in connection with the gear box which is also not shown, in the usual manner, and in the operation of a wheel made in this manner, the wheel proper including the hub and drum member $c$ which also serves as the brake drum, and the parts $f^7$ and $g$ which form a supplemental central hub member, all rotate with the axle shaft $b$ which is secured in said supplemental hub member, and while I have shown only one set of balls in the ball bearings $h$, it will be understood that a plurality of such sets may be employed if desired, or said balls may be substituted by rollers of well known constructions, and other changes in and modifications of the details of my improved wheel and axle shaft construction as herein shown and described may be made, within the scope of the appended claims, without departing from the spirit of my invention or sacrificing its advantages.

The object of providing two pairs of brake arms, and corresponding pairs of brake shoes operating respectively on the inner side and outer side portion of the hub and brake drum $c$, and the tubular brake operating shaft $j$, and the supplemental brake operating shaft $j^2$ passing therethrough, is to provide two sets of brake devices, one of which may be operated as an emergency brake, or brake apparatus, and the other, or both, of which may be operated as an emergency brake apparatus if desired.

Having fully described my invention what I claim as new and desire to secure by Letters Patent is:—

1. In a rear wheel and axle shaft construction for power driven vehicles, a tubular axle, an axle shaft passing therethrough and provided at its outer end with a head, a wheel rotatably mounted on said axle and comprising a rim member, a brake drum member and a hub member into which the tubular axle extends and to which the head of the axle shaft is secured, the inner end of the brake drum member being extended inwardly of the rim member, and the outer end of the hub member being projected outwardly of the rim member, spokes connecting the rim member with the inner end of the brake drum member and with the outer end of the hub member, and bearings placed between the end portion of the tubular axle and the hub and in the central plane of the rim member.

2. In a rear wheel and axle shaft construction for power driven vehicles, a tubular axle, an axle shaft passing therethrough and provided at its outer end with a head, a wheel rotatably mounted on said axle and comprising a rim member, a brake drum member and a hub member into which the tubular axle extends and to which the head of the axle shaft is secured, the inner end of the brake drum member being extended inwardly of the rim member and the outer end of the hub member being projected outwardly of the rim member, spokes connecting the rim member with the inner end of the brake drum member and with the outer end of the hub member, bearings placed between the end portion of the tubular axle and the hub and in the central plane of the rim member, and brake devices arranged within the brake drum member and on the opposite sides of said bearings and said central plane and adapted to operate in connection with said brake drum member.

In testimony that I claim the foregoing as my invention I have signed my name in presence of the subscribing witnesses this 17th day of October 1913.

HEBRON B. LAYMAN.

Witnesses:
C. MULREANY,
S. ANDREWS.